United States Patent

Iversen

Patent Number: 5,168,979
Date of Patent: Dec. 8, 1992

[54] ACCUMULATION CONVEYOR

[75] Inventor: Lorens P. Iversen, Hobro, Denmark

[73] Assignee: Univeyor A/S, Arden, Denmark

[21] Appl. No.: 752,450

[22] PCT Filed: Feb. 28, 1990

[86] PCT No.: PCT/DK90/00057
§ 371 Date: Sep. 3, 1991
§ 102(e) Date: Sep. 3, 1991

[87] PCT Pub. No.: WO90/09940
PCT Pub. Date: Sep. 7, 1990

[30] Foreign Application Priority Data

Mar. 1, 1989 [DK] Denmark .............. 0973/89

[51] Int. Cl.⁵ .................................. B65G 13/06
[52] U.S. Cl. ...................................... 198/781
[58] Field of Search ......................... 198/781

[56] References Cited

U.S. PATENT DOCUMENTS

| 3,537,568 | 11/1970 | Leach | 198/781 |
|---|---|---|---|
| 4,063,636 | 12/1977 | vom Stein | 198/781 |
| 4,362,238 | 12/1982 | Rivette | 198/781 |
| 4,562,920 | 1/1986 | Jaffre | 198/781 |
| 4,752,000 | 6/1988 | Hodgin | 198/781 |
| 4,781,283 | 11/1988 | Bentley et al. | 198/781 |
| 4,798,282 | 1/1989 | Sperduti et al. | 198/781 |

Primary Examiner—Joseph E. Valenza
Attorney, Agent, or Firm—Antonelli, Terry, Stout & Kraus

[57] ABSTRACT

An accumulation conveyor including a number of conveyor sections with mutually drivingly connected transport rollers on which a load, for example, a pallet container, can be conveyed or supported, and which is driven by a common drive motor by a drive chain drivingly connected with a transport roller of each conveyor section via a drive wheel and a clutch built into the transport roller. The clutch has a control connection with a detecting member arranged to detect the presence of a load placed on the conveyor section, and a control connection with a clutch of a neighboring section. The clutch includes a clutch hub rotatably journaled on a carrier axle at an end part of the transport roller and carries the drive wheel. The clutch hub is surrounded by a connector sleeve which is rotatable with respect to the clutch hub and mounted inside the end part of the transport roller, outside of which the connector sleeve is rotatably connected to a bringing body with radially outwardly projecting control cams and none rotatably connected to a gear wheel intended for driving engagement with a neighboring transport roller. A clutching member is provided between the clutch hub and the connector sleeve, with the clutching member being arranged to release the clutch hub when the ring body is prevented from rotating by engagement between a controlling pawl and one of the control cams.

8 Claims, 2 Drawing Sheets

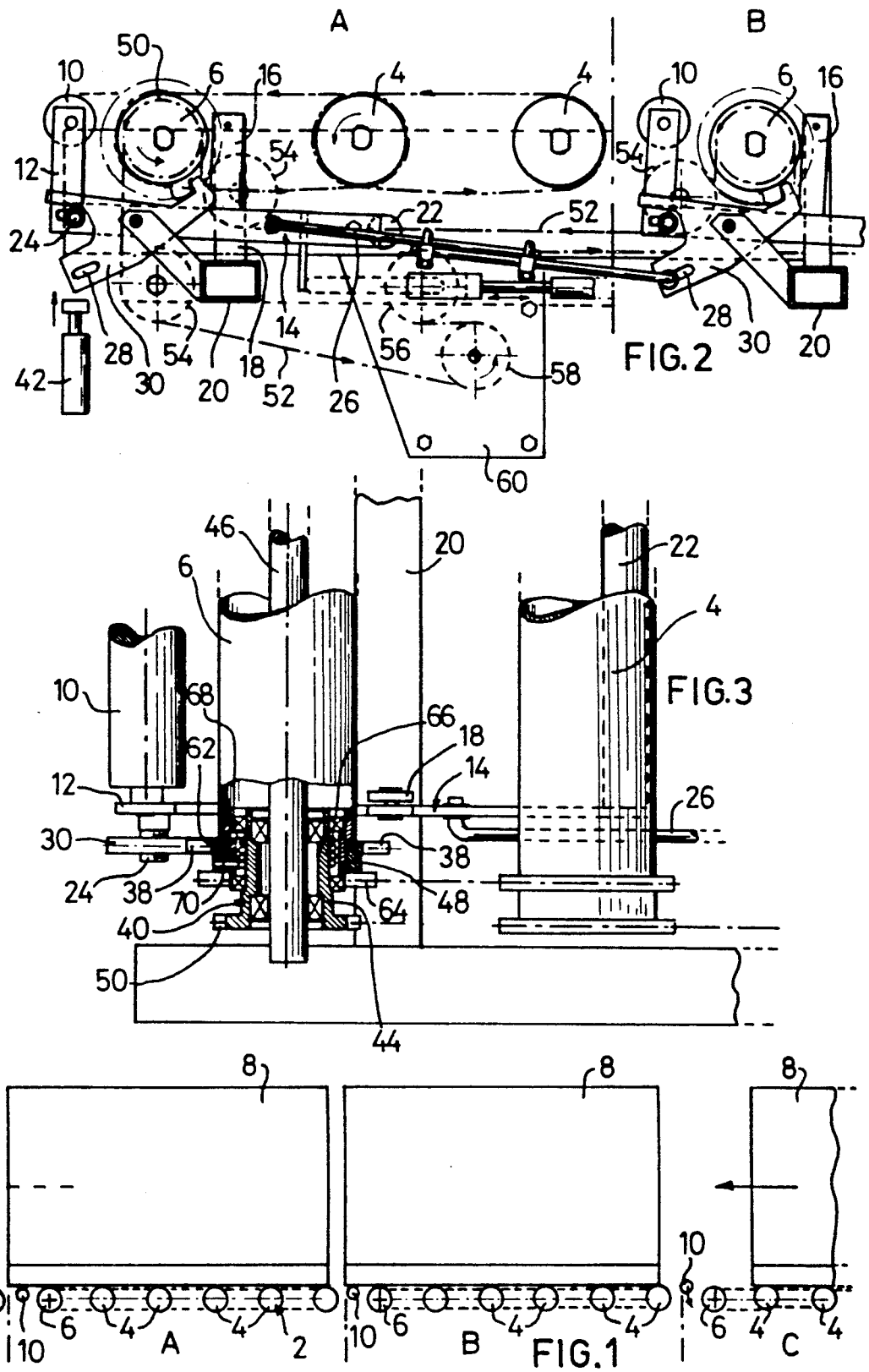

ACCUMULATION CONVEYOR

FIELD OF THE INVENTION

The present invention relates to an accumulation conveyor comprising a number of conveyor sections with mutually drivingly connected transport rollers, and of the kind presented in the introductory part of claim 1.

BACKGROUND OF THE INVENTION

A known accumulation conveyor of this kind has a very complicated drive system wherein, for each conveyor section with corresponding drive shaft, a clutch is placed at a distance below the row of transport rollers, and wherein the drive shafts of each section are mutually connected by a separate system of drive chains, which drive chain system is placed abreast of the clutches but at the opposite side of the conveyor. Furthermore each clutch is in direct driving engagement with two transport rollers.

SUMMARY OF THE INVENTION

The purpose of the invention is to provide an improved accumulation conveyor of the kind mentioned, and which by simple provisions may exhibit a considerably simplified and more reliable drive system.

The accumulation conveyor according to the invention is distinctive in that the clutch is constituted by a clutch hub rotatably journaled on a carrier axle at an end part of the transport roller and carrying the said drive wheel, the clutch hub being surrounded by a connector sleeve which is rotatable in relation to the clutch hub and mounted inside the end part of the transport roller, outside of which the connector sleeve is rotatably connected to a ring body with radially outwardly protruding control cams and irrotatably connected to a gear wheel intended for driving engagement with a neighboring transport roller, and in that between the clutch hub and the connector sleeve a clutching member is provided which is arranged to release the clutch hub when the ring body is prevented from rotating by an outer engagement between a controlling pawl and one of the said control cams. Thus by of simple provisions a significant general mechanical simplification of accumulation conveyors can be attained which may furthermore have a significantly improved reliability in relation to the mentioned previously known conveyor. The compact construction involves a very significant overall reduction in weight which, together with the compact configuration, results in a significant reduction of the costs of shipping the conveyor.

With a view towards including a very simple and reliable clutch in the individual conveyor sections of the accumulation conveyor according to the invention, the clutching member is constituted by a coil spring with radially protruding ends, which coil spring is dimensioned in the fashion of a spring clamping band in such a way that in a free condition, the coil spring can clutch and engage the clutch hub, and by shifting the protruding ends towards each other along the circumference of the coil spring, the coil spring can be released from the the clutch hub, as a short protruding end of the coil spring engages a radial hole in that part of the connector sleeve which is mounted inside the transport roller while a longer protruding end part of the coil spring engages the ring body via a bent slot in the wall of the connector sleeve outside the end part of the transport roller.

The accumulation conveyor according to the invention is preferably arranged such that the connection between the detecting member and the clutch of a neighbouring section, preferably, an upstream conveyor section, is preferably constituted by a stiff linking rod, and the said detecting member is constituted by a pivotably journaled sensing roller which is arranged, preferably, downstream of the transport roller wherein the clutch is arranged, width the sensing roller being mounted in a known manner between arm parts of a pivotably journaled arm system which at one side of the conveyor section has a sideways protruding control pin engaging a cut-out of a pivotably journaled pawl arm which opposite of the cutout is provided with the said controlling pawl, and which is arranged to be swung between a position wherein the controlling pawl extends into the path of rotation of the radial control cams of the said ring body of the clutch, and a position wherein the controlling pawl does not extend into the path of rotation, the center of gravity of the pawl arm being placed such that the pawl arm will automatically enter the first-mentioned position if the engagement between the control pin and the pawl arm allows this, the arm system comprising a counterweight, preferably placed upstream of the said transport roller, which acts on the sensing roll to swing it upward into the transport path, and that, by a linking rod, the arm system is in such a way connected to a corresponding pawl arm of an upstream conveyor section that the pawl arm in the upstream conveyor section is only allowed to engage the corresponding control cams if the sensing roll of the downstream conveyor section is swung down by the action of a load present on the section, for example, a pallet.

And, preferably, close to the cutout, the pawl arm is shaped with a slot extending mainly longitudinally, and which is engaged by an end part of the linking rod of the downstream conveyor section. Thus, in a simple way the pawl arm is enabled to be swung by the action both of its own sensing roller, via the control pin, and by the sensing roller of the downstream section, via the linking rod.

With a view to restarting the final conveyor section for discharging a moving load from it, at least the final conveyor section, that is, the one at the discharging end of the conveyor, comprises an activation member which is arranged to guide the pawl arm, independently of the sensing roller and the arm system, into the position where its controlling pawl does not engage the said radial control cams of the clutch.

BRIEF DESCRIPTION OF THE DRAWINGS

The invention will be more closely explained in the following with reference to the drawing, wherein:

FIG. 1 is a side view for illustrating the operation of an accumulation conveyor according to the invention, FIG. 2 is a side view of a shortened part of an embodiment of an accumulation conveyor according to the invention, FIG. 3 is a partial cross-sectional top view of an embodiment of a clutch for a conveyor according to the invention.

DETAILED DESCRIPTION

Figure 4:
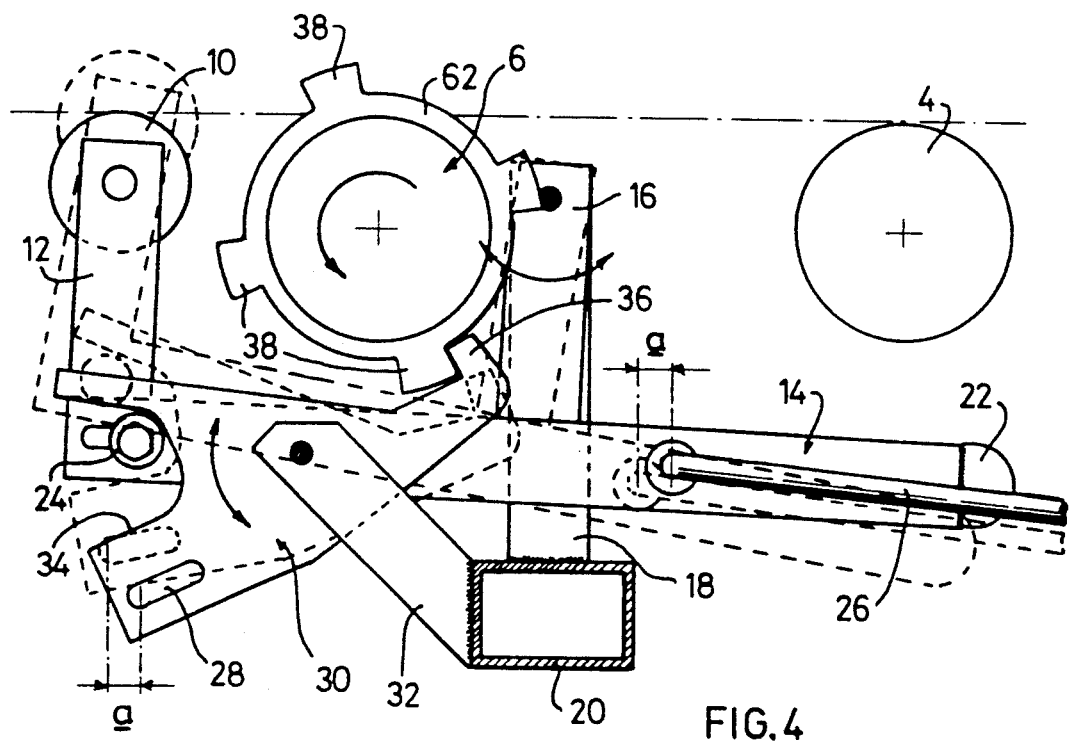
FIG. 4 is a side view serving to illustrate the operation of the accumulation conveyor according to the invention.

The accumulation conveyor shown in FIG. 1 comprises a plurality of conveyor sections A, B, C . . . with a plurality of mutually drivingly connected transport rollers 4, with each conveyor section A, B, C . . . also comprising a transport roller 6 which is connected, via a built-in clutch, to a drive motor which is common for all sections A, B, C . . . . The conveyor 2 is intended for accumulating load items in a row, for example, pallet containers 8, which may be put on the conveyor 2 at a charging end opposite the section A, or pallet containers 8 can be loaded onto an empty section from the side of the conveyor 2 by of a fork lift.

Each conveyor section A, B, C . . . is provided with a sensing roller 10 arranged downstream of the transport roller 6, and has a control connection with the clutch in the transport roller 6, in such a way that the conveyor section A, B, C . . . is released from its drive engagement with the drive motor when the section's own sensing roller 10 is swung down by the action of a load at the section's downstream end, but only if the corresponding sensing roller at a downstream section is also swung down by the action of a load, for example, a pallet container 8. This means that the pallet container 8 shown in movement on the C section will act on the sensing roller 10 at the downstream end of the C section and release this because the sensing roller 10 of the B section is swung down already. Only the final A section is a little different because the function of the sensing roller 10 of the A section cannot, according to its nature, be influenced by the state of a downstream section. To compensate, the A section comprises a special activation member 42 (FIG. 2) intended to activate the A section despite of the presence of a load on top of the sensing roller 10, such that a discharge of load items from the accumulation conveyor 2 may happen via a separate roller conveyor placed downstream of the A section. In response to which load items, for example, pallet containers 8, present on the upstream sections B, C . . . will automatically be conveyed downstream on the conveyor.

In FIG. 2 the A section is shown in a shortened form only comprising the two transport rollers 4 and the transport roller 6 with its built-in clutch (FIG. 3). Normally each section A, B, C . . . comprises a number of transport rollers 4 which is determined by the actual application, that is, the length of the actual load items, for example, pallet containers 8. The sensing roller 10 is mounted between upstanding arm parts 12 of an arm system 14 which is pivotably suspended, by arm parts 16 likewise upstanding upstream of the transport roller 6, on vertical supports 18 which are welded onto a transverse bar 20. Opposite of the arm parts 12 and at a distance upstream of the arm parts 16, the arm system 14 is provided with a transverse counterweight 22 in the shape of a solid cylindrical steel body. At a side of the conveyor 2 and near the lower end of one of the arm parts 12, the arm system 14 is provided with a sideways protruding adjustable control pin 24, and between one of the arm parts 14 and the counterweight 22 the arm system 14 is pivotably connected with a linking rod 26 of which an opposing end part engages a slot 28 of a pivotable pawl arm 30 of the B section, that is, of an upstream conveyor section. And in an entirely similar fashion the arm system 14 of the B section has a connection with the pawl arm 30 of the C section and so forth.

The A section also has a pawl arm 30 (FIG. 2-4) which is pivotably suspended on a sloping carrier arm 32 welded onto the downstream side of the transverse bar 20 and protruding downstream/upwards. The pawl arm 30 is shaped with a downstream directed cutout 34 engaged by the control pin 24, the pawl arm being suspended in such a way that its center of gravity is placed downstream of its turning point, that is, such that the pawl arm 30 will automatically assume the position shown in solid lines in FIG. 4, provided that the engagement between the control pin 24 and the cutout 34 allows this. Opposite the cutout 34 the pawl arm is provided with a controlling pawl 36 which, in the position of the pawl arm 30 as shown, extends upward and into the path of rotation of radial control cams 38 of a clutch 40 (FIG. 3) built into the transport roller 6. The position of the pawl arm 30 shown in solid lines corresponds to the sensing roller 10 and the arm system 14 being swung down by the action of a load item (FIG. 1) present on the A section.

As shown in dashed lines in FIG. 4, the pawl arm 30 can assume a position wherein the controlling pawl 36 does not extend into the path of rotation of the control cams 38 of the clutch 40, that is, corresponding to the A section being in operation. This position of the pawl arm 30 can be attained by the action of the controlling pin 24, that is, by the arm system 14 swinging up, provided that there is room for the sensing roller 10 to enter the conveyor path because of no load being present over the sensing roller 10; or the position can be attained by acting on the pawl arm 30 with an upwardly directed force, for example, as shown in FIG. 2, by an activation cylinder 42 which may be a possibility if it is desired to force the A section to discharge a load item via a connected external conveyor. The forced control of the pawl arm 30 must be maintained until the A section is empty, that is, until the load items have passed the sensing roller 10 in the A section.

Similarly, the rule applies to the upstream sections B, C . . . that the upward-swung position as shown of the pawl arm 30 can be attained by the swinging-up of the sensing roller 10 and the arm system 14 of a downstream section, for example, the A section, as the linking rod 26 will automatically, by its engagement in the slot 28 of the pawl arm 30 of the upstream section, move the actual pawl arm 30 out of engagement with the corresponding control cams 38, by the linking rod 26 becoming shifted a distance a to the left in the drawing, that is, it exerts a pull at the lower part of the pawl arm 30 which is thus swung out of engagement with the control cams 38 of the corresponding clutch 40.

If regular accumulation of load items, for example, pallet containers 8, on an empty or partly empty accumulation conveyor according to the invention is concerned, however, the following happens:

When the foremost load item arrives at the A section and acts on the sensing roller 10 swinging it down, the pawl arm 30 of the A section is immediately swung into engagement with a clutch control cam 38 and stops the A section. The pawl arm 30 of the B section remains out of engagement with the clutch control cams 38 of the B section because the pawl arm 30 in the B section is held swung away from the clutch control cams 38 by the engagement between the control pin 24 and the upper flange of the cutout 34 at the downstream end of the pawl arm, which is possible only because the engagement between the linking rod 26 and the pawl arm 30 takes place via the slot 28, which thus allows such presetting of the pawl arm in the B section. Later only, when the second load item acts on the sensing roller 10 in the B section, the B section is released by the pawl arm 30 being swung into the path of rotation of the clutch control cams 38 by the action of control pin 24. By the swinging-down of the sensing roller 10 in the B section, the pawl arm 30 in the C section is pre-set correspondingly, and so on.

The clutch 40 which is built into the transport roller 6 in the conveyor sections A, B, C . . . , and which is shown in FIG. 3, includes a clutch hub 44 which is rotatably journaled on its inside on a carrier axle 46 for the transport roller 6, and which is also rotatably journaled in a connector sleeve 48, the clutch hub 44 carrying, outside the connector sleeve 48, a drive wheel 50 in the shape of a chain wheel which is in permanent drive engagement with a drive chain 52, the latter running along corresponding drive wheels 50 for the sections A, B, C . . . and a chain drive 58 of a drive motor on a motor console 60, via turning chain wheels 54 (FIG. 2) and a tightening wheel 56.

An end part of the connector sleeve 48 is fixed inside an end part of the transport roller 6 while an opposite end part of the connector sleeve 48 outside the transport roller 6 is provided with a ring body 62, which is rotatable relative to the connector sleeve and wherein the radially protruding control cams 38 are formed, and with a fixed chain wheel 64, by which the transport roller 6 is in permanent drive engagement with the other transport rollers 4 of the section. Between the connector sleeve 48 and the clutch hub 44, the clutch hub 44 is surrounded by a clutching member in the shape of a coil spring 66 with radially protruding ends, namely a short end 68 which engages a radial hole in that end part of the connector sleeve 48 which is fixed inside the transport roller 6, and a longer end 70 which engages the ring body 62 via a bent slot in the wall of the connector sleeve 48 outside the transport roller 6.

The coil spring 66 is dimensioned in such a way that in a free condition it can clutch and engage the clutch hub 44, and by shifting the respective ends 68 and 70 towards each other in the circumferential direction it can be expanded inside and can rotate freely in relation to the clutch hub, that is, with a clamping function corresponding to a spring clamping band as is often used for retaining hoses on tubing stubs.

The clutch 40 functions as follows, assuming that the accumulation conveyor 2 is in operation, that is, the clutch hub 44 is permanently drivingly turned in a counterclockwise direction.

By engagement between the controlling pawl 36 of the pawl arm 30 and one of the control cams 38, that is, by swinging down the sensing roller 10, the ring body 62 is prevented from rotating, whereby the long end part 70 of the coil spring 66, which cooperates with the ring body 62, is shifted in the circumferential direction toward the short end part 68 of the coil spring 66, which engages the connector sleeve 48, the inside diameter of the former thus becoming enlarged so that the clutch hub may rotate freely in relation to the transport roller 6 which stops, together with the other transport rollers 4 of the section.

The coil spring 66 is dimensioned such that the clutch is activated when the ring body 62 is held through a path of rotation corresponding to about 15°, that is, the length of the circumferentially bent slot in the wall of the connector sleeve 48 must at least span an arc of a corresponding size.

I claim:
1. An accumulation conveyor comprising: a plurality of conveyor sections with mutually drivingly connected transport rollers on which a load can be conveyed or supported, which conveyor is driven by a common drive motor by a drive chain drivingly connected with a transport roller of each conveyor section via a drive wheel and a clutch built into said transport roller, the clutch having a connection with a detecting member arranged to detect the presence of a load placed on the conveyor section, and which has a connection with a clutch of neighboring section wherein said clutch inlucdes a clutch hub rotatably journaled on a carrier axle and an end part of the said transport roller and carrying said drive wheel, the clutch hub being surrounded by a connector sleeve rotatable with respect to the clutch hub and mounted inside said end part of the transport roller, outside of which said connector sleeve is rotatably connected to a ring body with radially outwardly projecting control cams and fixedly connected to a gear wheel intended for driving engagement with a neighboring transport roller, and wherein, between the clutch hub and the connector sleeve, a clutching member is provided arranged to release the clutch hub when said ring body is prevented from rotating by an outer engagement between a controlling pawl and one of said radially outwardly projecting control cams.

2. A conveyor according to claim 1, wherein said clutching member includes a coil spring with radially projecting ends having differing lengths, said coil spring being fashioned as a spring clamping band in such a manner that, in a free condition, the coil spring can clutch and engage the clutch hub, and by shifting said projecting ends towards each other along a circumference of the coil spring, the coil spring can be released from the clutch hub, as a shorter of the projecting ends of the coil spring engages a radial hole in that part of the connector sleeve mounted inside the transport roller while a longer of the projecting ends of the coil spring engages said ring body via a bent slot in the wall of the connector sleeve outside said end part of the transport roller.

3. A conveyor according to one of claims 1 or 2, wherein the control connection between said detecting member and the clutch of a neighboring section includes a stiff linking rod, said detecting member includes a pivotably journaled sensing roller arranged downstream of the transport roller in which the clutch is arranged, the sensing roller is mounted between arm parts of a pivotably journaled arm system which at one side of the conveyor section has a sideways projecting control pin engaging a cutout of a pivotably journaled pawl arm which opposite said cutout is provided with said controlling pawl, and is arranged to be swung between a first position in which the controlling pawl extends into the path of rotation of teh said radially outwardly projecting control cams of said ring body of the clutch, and a second position in which the controlling pawl does not extend into said path of rotation, a center of gravity of the pawl are is placed such that the pawl arm will automatically enter said first position if the engagement between the control pin and the pawl arm allows engagement, wherein the arm system comprises a counterweight adapted to act on the sensing roller to swing the sensing roller upward into the transport path, and wherein by a linking rod the arm system is connected to a corresponding pawl arm of an upstream conveyor section in such a manner that the pawl arm in the upstream conveyor section is only allowed to engage the corresponding radially outwardly projecting control cams if the sensing roller of the downstream conveyor section is swung down by the action of a load present on the section.

4. A conveyor according to claim 3, wherein, near to said cutout, the pawl arm is shaped with a slot extending mainly longitudinally, and wherein said slot is engaged by an end part of said linking rod of the downstream conveyor section.

5. A conveyor according to claim 3, wherein, at least the final conveyor section at a discharging end of the conveyor comprises an activation member arranged to guide the pawl arm, independently of the sensing roller and the arm system, into the said second position.

6. A conveyor according to claim 3, wherein the counterweight is disposed upstream of said transport roller.

7. A conveyor according to one of claims 1 or 2, wherein the load is a pallet container.

8. A conveyor according to claim 7, wherein said neighboring section is an upstream conveyor section.

* * * * *